United States Patent [19]

Kitamura et al.

[11] Patent Number: 5,834,098
[45] Date of Patent: Nov. 10, 1998

[54] LAMINATE WITH EXCELLENT PRINTABILITY

[75] Inventors: Kazuhisa Kitamura; Koichi Asami, both of Ibaraki, Japan

[73] Assignee: Oji-Yuka Synthetic Paper Co., Ltd., Tokyo, Japan

[21] Appl. No.: 879,048

[22] Filed: Jun. 19, 1997

[30] Foreign Application Priority Data

Jun. 20, 1996 [JP] Japan .................................. 8-159971

[51] Int. Cl.⁶ ........................................................ B32B 3/00
[52] U.S. Cl. ....................... 428/195; 428/323; 428/473.5; 428/476.3; 428/476.9; 428/520
[58] Field of Search .................................... 428/195, 323, 428/330, 407, 409, 473.5, 476.3, 476.9, 520, 523

[56] References Cited

U.S. PATENT DOCUMENTS

| 4,663,216 | 5/1987 | Toyoda et al. . | |
|---|---|---|---|
| 4,906,526 | 3/1990 | Inoue et al. | 428/473.5 |
| 5,397,637 | 3/1995 | Asami et al. . | |
| 5,667,872 | 9/1997 | Ohno et al. | 428/141 |

*Primary Examiner*—Elizabeth Evans
*Attorney, Agent, or Firm*—Oblon, Spivak, McClelland, Maier & Neustadt, P.C.

[57] ABSTRACT

A laminate comprising a thermoplastic resin film having thereon a coating layer containing (A) 100 parts by weight of an antistatic agent comprising a water-soluble quaternary nitrogen-containing polymer, (B) 10 to 600 parts by weight of a polyethyleneimine polymer selected from the group consisting of polyethyleneimine, alkyl-modified polyethyleneimine, poly(ethyleneimine-urea), and an ethyleneimine adduct of polyaminepolyamide, and (C) 25 to 1000 parts by weight of a polyalkylene ether polymer selected from the group consisting of polyethylene glycol, polypropylene glycol, an ethylene oxide-propylene oxide copolymer, and derivatives thereof, each having a molecular weight of 200 to 20,000. The laminate has excellent antistatic properties and offset printability.

19 Claims, No Drawings

LAMINATE WITH EXCELLENT PRINTABILITY

FIELD OF THE INVENTION

This invention relates to a laminate exhibiting excellent antistatic properties, offset printability, and gravure printability.

BACKGROUND OF THE INVENTION

A transparent or semitransparent film comprising a single layer of a polyolefin containing an inorganic fine powder or a laminated structure having on at least one side thereof the inorganic fine powder-containing polyolefin layer, particularly the one in which the polyolefin layer is stretched at least uniaxially, is useful as synthetic paper.

Such synthetic paper comprising an inorganic fine powder- or organic filler-containing thermoplastic resin film as a base layer has been in wide use because of its excellent physical properties, such as water resistance, toughness, and surface smoothness. With its increasing utility, synthetic paper of this type exhibiting even better antistatic properties, offset printability or printability with ultraviolet-curing ink is in great demand.

Because polyolefins are non-polar and hydrophobic materials, polyolefin synthetic paper does not always have satisfactory antistatic properties or offset printability. Polyolefin synthetic paper is thus usually subjected to an appropriate surface treatment to improve these properties. Application of a coating agent is amongst such surface treatments.

Known coating agents for synthetic paper include cationic antistatic agents and amphoteric antistatic agents as disclosed in JP-A-50-161478 (the term "JP-A" as used herein means an "unexamined published Japanese patent application") and U.S. Pat. Nos. 4,091,165 and 4,420,530.

For example, U.S. Pat. No. 4,420,530 discloses a water-soluble coating composition comprising (1) a water-soluble polymer obtained by preparing a tertiary nitrogen-containing polymer from a monomer represented by formula $CH_2=CR^1$—$COOANR^3R^4$ (wherein $R^1$ represents a hydrogen atom or a methyl group; A represents an alkylene group having 2 to 6 carbon atoms; and $R^3$ and $R^4$ each represent a hydrogen atom or an alkyl group having 1 to 2 carbon atoms), a monomer represented by formula $CH_2=CR^1$—$COOR^2$ (wherein $R^1$ is as defined above; and $R^2$ represents an alkyl group having 1 to 8 carbon atoms) and other hydrophobic vinyl monomers, and quaternizing the tertiary nitrogen atom of the polymer with a cationizing agent to make the polymer amphoteric, (2) a water-soluble polyaminepolyamide-epichlorohydrin adduct, and (3) a polyethyleneimine compound.

U.S. Pat. No. 4,097,645 discloses an electrically conducting agent having an antistatic effect which comprises a polymer having a repeating unit represented by formula:

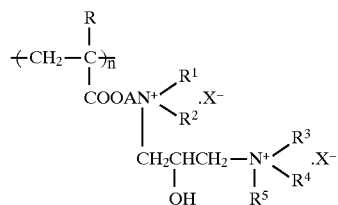

wherein R represents a hydrogen atom or a methyl group; $R^1$ and $R^2$ each represent a methyl group or an ethyl group; $R^3$ and $R^4$ each represent a methyl group, an ethyl group, $-(CH_2-CH_2-O)_m-H$ (wherein m is an integer of 1 to 4) or a benzyl group; $R^5$ represents an alkyl group having 1 to 18 carbon atoms, an alkenyl group or $-(CH_2CH_2-)_p-H$ (wherein p is an integer of 1 to 4); $X^+$ represents a halide ion; A represents a substituted or unsubstituted alkylene group; and n represents an integer usually ranging from $10^1$ to $10^4$.

Application of these antistatic agents is effective in general antistatic offset printing, but the effect is sometimes insufficient in printing in a low humidity environment, for example, in winter. In other words, an increase in ion quantity, in an attempt to improve antistatic properties, would make the antistatic agent excessively hydrophilic, making offset printing not feasible. The limit of the ion quantity with weight attached to offset printability has thus been a hindrance to further improvement in antistatic properties. Therefore, none of the coating agents proposed to date exhibit a combination of both satisfactory antistatic properties and printability.

For the foregoing reasons, there exists a need for a synthetic paper that exhibits a superior combination of both antistatic and printability properties.

SUMMARY OF THE INVENTION

An object, therefore, of the present invention is to provide synthetic paper having both the conflicting properties, that is, excellent antistatic properties and offset printability.

In the light of the above problems, the inventor of the present invention has conducted an extensive investigation and reached the present invention.

The present invention provides a laminate comprising a thermoplastic resin film having thereon a coating layer containing (A) 100 parts by weight of an antistatic agent comprising a water-soluble quaternary nitrogen-containing polymer, (B) 10 to 600 parts by weight of a polyethyleneimine polymer selected from the group consisting of polyethyleneimine, alkyl-modified polyethyleneimine, poly(ethyleneimine-urea), and an ethyleneimine adduct of polyaminepolyamide, and (C) 25 to 1000 parts by weight of a polyalkylene ether polymer selected from the group consisting of polyethylene glycol, polypropylene glycol, an ethylene oxide-propylene oxide copolymer, and derivatives thereof, each having a weight average molecular weight of 200 to 20,000. Molecular weights are expressed as weight averages in the application unless otherwise specified.

Component (A) has an antistatic effect, component (B) serves as a primer effective in improving ink adhesion, and component (C) functions as a lubricant. Components (A), (B) and (C) synergistically produce an excellent antistatic effect even in a low humidity environment without impairing offset printability.

DETAILED DESCRIPTION OF THE INVENTION

The laminate according to the present invention is composed of a base layer of a thermoplastic resin film, particularly a polyolefin synthetic paper layer, on which a coating composition has been applied and dried to provide a coating layer comprising (A) an antistatic agent comprising a water-soluble quaternary nitrogen-containing polymer, (B) a polyethyleneimine polymer, and (C) a polyalkylene ether polymer.

The thermoplastic resin film which can be used as a base layer includes films or sheets having a surface of a thermoplastic resin, such as a polyolefin (e.g., polypropylene, polyethylene, and a propylene-ethylene copolymer), polyethylene terephthalate, polybutylene terephthalate, polystyrene, polyamide (such as NYLON-6), or the like, which may contain an inorganic fine powder or an organic filler. "Fine powder" in the context of the present application is used to denote powder with a particle size ranging from 0.05 to 10 μm.

These thermoplastic resin films, especially synthetic paper per se are well known in the art. For details, reference can be made to JP-B-49-1782 (the term "JP-B" as used herein means an "examined published Japanese patent application"), JP-A-56-118437, JP-A-57-12642, and JP-A-57-56224.

Specific examples of the thermoplastic resin film as a base layer include a laminated film comprising a base of a biaxially stretched thermoplastic resin film containing 5 to 40% by weight of an inorganic fine powder and a surface layer of a uniaxially stretched polyolefin film containing 8 to 65% by weight of an inorganic fine powder, e.g., calcined clay, diatomaceous earth, titanium oxide, vermiculite, calcium carbonate or talc, having a particle size of, e.g., from 0.05 to 10 μm, the surface layer having fine cracks around the fine inorganic particles on the surface thereof and a number of microvoids (at least 5 voids per mm$^2$) in the inside thereof as described in U.S. Pat. No. 4,318,950, which is incorporated herein by reference, and JP-B-46-40794; and multi-layer synthetic paper comprising the above-mentioned laminated film having further laminated thereon a polyolefin film layer containing substantially no fine inorganic powder and having a thickness of from 0.5 to 50 μm or synthetic paper with a pearly luster comprising a biaxially stretched thermoplastic resin film containing from 10 to 40% by weight of an inorganic fine powder as described in JP-A-61-3748 or JP-B-1-6041.

Before being coated with a coating agent, the thermoplastic resin film may be subjected to a surface treatment such as a corona discharge treatment, a flame treatment, a plasma treatment, an ozone treatment, etc.

The coating layer essentially comprises (A) 100 parts by weight of an antistatic agent comprising a water-soluble quaternary nitrogen-containing polymer; (B) 10 to 600 parts by weight of a polyethyleneimine polymer selected from the group consisting of polyethyleneimine, alkyl-modified polyethyleneimine, poly(ethyleneimine-urea), and an ethyleneimine adduct of polyaminepolyamide; and (C) 25 to 1000 parts by weight of a polyalkylene ether polymer selected from the group consisting of polyethylene glycol, polypropylene glycol, an ethylene oxide-propylene oxide copolymer, and derivatives thereof, each having a weight average molecular weight of 200 to 20,000.

In addition to the essential components (A) to (C), the coating layer can contain (D) 10 to 500 parts by weight of an epichlorohydrin adduct of polyaminepolyamide and/or (E) 5 to 200 parts by weight of an alkali metal salt or an alkaline earth metal salt, each per 100 parts by weight of component (A).

The antistatic agent as component (A) can be prepared by polymerizing a corresponding nitrogen-containing monomer and, if necessary, quaternizing the resulting tertiary nitrogen-containing polymer, as described in JP-A-59-43065.

Suitable quaternary nitrogen-containing monomers which can be used in the present invention include those represented by the following formulae (I) to (IV):

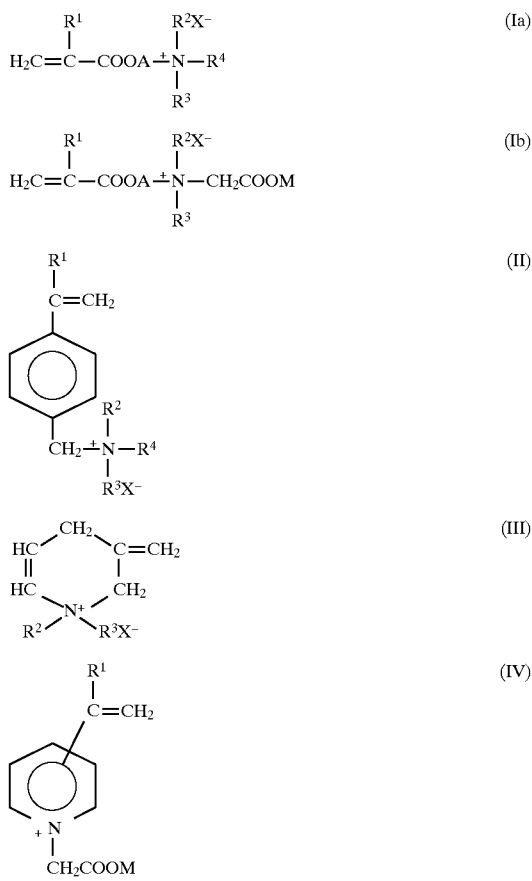

wherein $R^1$ represents a hydrogen atom or a methyl group; $R^2$ and $R^3$ each represent a lower alkyl group (preferably an alkyl group having 1 to 4, particularly 1 to 2, carbon atoms); $R^4$ represents a saturated or unsaturated alkyl group having 1 to 22 carbon atoms or a cycloalkyl group (preferably having 4 to 22 carbon atoms); $X^-$ represents a counter anion of the quaternary $N^+$ (e.g., a halide ion, preferably a chloride ion); M represents an alkali metal ion (preferably Na, K or Li ion); and A represents an alkylene group having 2 to 6 carbon atoms. The term "alkyl" as used in the application denotes a straight chain or branched alkyl group.

The polymer comprising the quaternary nitrogen-containing monomer unit represented by formulae (I) to (IV) can be obtained by polymerizing a precursor of the respective monomer unit followed by quaternizing the tertiary nitrogen of the resulting polymer with a cationizing agent, such as an alkyl halide, dimethyl sulfate, or a monochloroacetic ester.

While the antistatic agent to be used in the invention must be water-soluble, it should not be excessively water-soluble. From this viewpoint, the quaternary nitrogen-containing polymer as component (A) is preferably a copolymer comprising the above-described monomer and a hydrophobic monomer. Suitable hydrophobic monomers include copolymerizable vinyl monomers such as styrene the aromatic ring or side chain of which may be substituted, an acrylic or methacrylic ester, and a vinyl halide.

Particularly preferred component (A) is a copolymer comprising (a) 20 to 40% by weight of the quaternary nitrogen-containing monomer represented by formulae (I) to (IV) or a precursor monomer thereof, (b) 60 to 80% by weight of a hydrophobic monomer represented by formula (V):

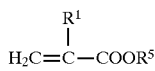

$$H_2C=\overset{\overset{R^1}{|}}{C}-COOR^5 \quad (V)$$

wherein $R^1$ represents a hydrogen atom or a methyl group; and $R^5$ represents an alkyl group having 1 to 22 carbon atoms, an aralkyl group having 7 to 22 carbon atoms or a cycloalkyl group having 5 to 22 carbon atoms, and (c) 0 to 20% by weight of other copolymerizable vinyl monomers. The term "aralkyl" is used in the present specification to denote an aryl group, such as phenyl, naphthyl or anthracenyl, in which one or more hydrogene atoms may be replaced with an alkyl group as defined above. The term "cycloalkyl" is used to denote a cyclic saturated hydrocarbon of 3 to 10 member ring; further one or more hydrogen atoms may be substituted by alkyl groups.

The most suitable component (A) for use in the invention is the above-described copolymer in which monomer (a) is the compound represented by formula (I) wherein $X^-$ is $Cl^-$ Additionally preferred is the quaternary ammonium salt copolymer described in JP-A-6-25447, which is obtained by copolymerizing (a') 30 to 70% by weight of a monomer represented by formula (VI):

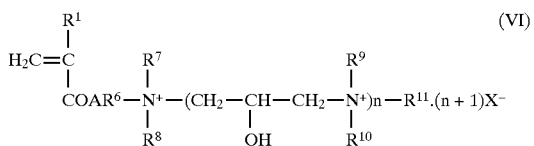

wherein A represents —O— or —NH—; $R^1$ represents a hydrogen atom or a methyl group; $R^6$ represents an alkylene group having 2 to 4 carbon atoms or —CH$_2$—CH(OH)—CH$_2$—; $R^7$, $R^8$, $R^9$, and $R^{10}$, which may be the same or different, each represent an alkyl group having 1 to 3 carbon atoms; $R^{11}$ represents an alkyl group having 1 to 10 carbon atoms or an aralkyl group having 7 to 10 carbon atoms; n represents an integer of 1 to 3; and X represents a chlorine atom, a bromine atom or an iodine atom, (b) 30 to 70% by weight of the hydrophobic monomer represented by formula (V), and (c) 0 to 40% by weight of other copolymerizable vinyl monomers.

A monomer unit corresponding to monomer (a') can be obtained by, for example, modifying a tertiary amine-containing monomer represented by formula (VII):

wherein A, $R^1$, $R^6$, $R^7$, and $R^8$ are as defined above in formula (VI), with a modifying agent represented by formula (VIII):

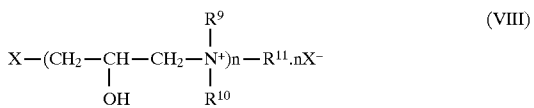

wherein $R^9$, $R^{10}$, $R^{11}$, and n are as defined above in formula (VI), either before or after copolymerization.

Examples of the tertiary amine-containing monomer of formula (VII) are dimethylaminoethyl (meth)acrylate, diethylaminoethyl (meth)acrylate, and dimethylaminopropyl(meth)acrylamide. Examples of the modifying agent of formula (VIII) include 3-chloro-2-hydroxypropyltrimethylammonium chloride.

The hydrophobic monomer as monomer (b) includes alkyl (meth)acrylates, such as methyl (meth)acrylate, ethyl (meth) acrylate, butyl (meth)acrylate, isobutyl (meth)acrylate, t-butyl (meth)acrylate, cyclohexyl (meth)acrylate, 2-ethylhexyl (meth)acrylate, lauryl (meth)acrylate, tridecyl (meth)acrylate, and stearyl (meth)acrylate. The term "(meth) acrylate" is used to denote acrylate or methacrylate.

The copolymerizable vinyl monomers, which may be used if desired, include hydrophobic monomers such as styrene, vinyltoluene, and vinyl acetate; and hydrophilic monomers such as vinylpyrrolidone and (meth)acrylamide. The term "(meth)acrylamide" is used to denote acrylamide or methacrylamide.

The polymerization of monomers (a) or (a') and (b) and, optionally, (c) is conducted in the presence of a radical initiator by bulk polymerization, solution polymerization, emulsion polymerization, or the like. Of these polymerization techniques, preferred is solution polymerization, in which the monomers are dissolved in a solvent and heated with stirring in a nitrogen stream in the presence of a radical polymerization initiator. Suitable solvents include water and alcohol such as methyl alcohol, ethyl alcohol, and isopropyl alcohol, and mixtures thereof. Suitable polymerization initiators include peroxides such as benzoyl peroxide and lauryl peroxide, and azo compounds such as azobisisobutyronitrile and azobisvaleronitrile. The total monomer concentration in the solution is usually from 10 to 60% by weight, and the initiator is usually used in a concentration of from 0.1 to 10% by weight based on the total monomers.

The quaternary ammonium salt copolymer (A) may have any desired level of molecular weight by controlling the polymerization temperature, the kind and amount of the initiator, the amount of the solvent and chain transfer agent, and the like. Suitable chain transfer agents include, but are not limited to, butyl mercaptan, n-octylmercaptan, n-dodecyl mercaptan, butyl or methyl mercaptopropionate, mercaptopropionic acid, 2-ethylhexyl-3-mercaptopropionate, n-butyl-3-mercaptopropionate, isodecylmercaptan, octadecylmercaptan, mercaptoacetic acid, haloalkyl compounds, such as carbon tetrabromide and bromodichloromethane. A preferred weight average molecular weight of the polymer is usually from 1,000 to 1,000,000, and particularly from 1,000 to 500,000.

The coating layer further contains a polyethyleneimine polymer as component (B) which is contributory to ink adhesion, particularly of an ultraviolet-curing ink.

Polyethyleneimine polymer (B) includes polyethyleneimine, poly(ethyleneimine-urea), a polyethyleneimine adduct of polyaminepolyamide, and an alkyl-modified (preferably C$_{1-8}$-alkyl-modified) polyethyleneimine (see JP-A-1-141736). From the standpoint of offset ink adhesion and ink transfer, preferred are polyethyleneimine and modified polyethyleneimine obtained by modifying a polyaminepolyamide-polyethyleneimine adduct with an alkyl halide having 1 to 24 carbon atoms, an alkenyl halide having 2 to 24 carbon atoms, a cycloalkyl halide having 5 to 24 carbon atoms or a benzyl halide.

The degree of polymerization of the polyethyleneimine to be used is not limited, but preferably ranges from 20 to 300.

The coating layer further contains a polyalkylene ether polymer as component (C). Polyalkylene ether polymer (C) includes those represented by the following formulae:

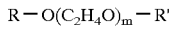

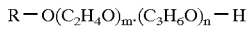

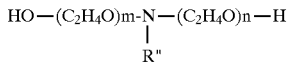

wherein R and R' each represent a hydrogen, a hydrocarbon group having 1 to 20 carbon atoms, an epoxy group or —COR''' (wherein R''' represents an alkyl group having 1 to 20 carbon atoms); R" represents an alkyl group having 1 to 20 carbon atoms; and m and n each represent an integer of from 3 to 100.

wherein R represents a lauryl group, an n-octyl group, a stearyl group or a cetyl group; and m represents an integer of from 4 to 480.

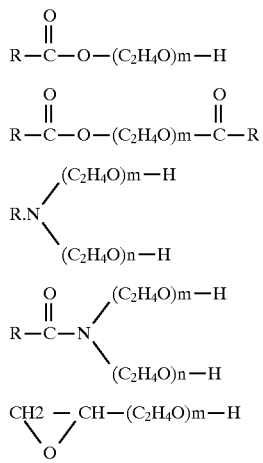

wherein R represents a lauryl group or a stearyl group; and m and n each represent an integer of from 3 to 100.

Specific examples of component (C) are polyethylene glycol, polypropylene glycol, ethylene oxide-propylene oxide copolymers, and derivatives thereof, such as an ethylene oxide adduct of lauryl alcohol, an ethylene oxide adduct of stearyl alcohol, and an ethylene oxide adduct of cetyl alcohol.

Among these polyalkylene ether polymers, preferred are polyethylene glycol, polypropylene glycol, ethylene oxide-propylene oxide copolymers and derivatives thereof, each having a weight average molecular weight of 200 to 20,000 and containing in the molecule thereof an alkylene ether moiety derived from ethylene oxide or propylene oxide and at least one alcoholic hydroxyl group at the molecular chain end thereof. Polyethylene glycol having a weight average molecular weight of 300 to 5,000 is particularly preferred.

If desired, the coating layer can furthermore contain an epichlorohydrin adduct of polyaminepolyamide as component (D). Component (D) is a water-soluble cationic thermosetting resin obtained by reacting polyamide prepared from a saturated dibasic carboxylic acid containing 3 to 10 carbon atoms and a polyalkylenepolyamine with epichlorohydrin. Details of component (D) are provided in JP-B-35-3547.

The saturated dibasic carboxylic acid having 3 to 10 carbon atoms preferably includes those having 4 to 8 carbon atoms, particularly adipic acid. Examples of suitable polyalkylenepolyamines are polyethylenepolyamine, particularly ethylenediamine, diethylenetriamine, and triethylenetetramine, with diethylenetriamine being especially preferred.

The polyalkylenepolyamine to dibasic acid molar ratio in the preparation of the polyamide is usually from about 0.9:1 to 1.2:1. In the subsequent reaction, epichlorohydrin is usually used in an amount of about 0.5 to 1.8 mol per mole of the total secondary amino group in the resulting polyamide.

Component (D) makes a contribution to improvement in water-resistant adhesion to ink.

If desired, the coating layer can furthermore contain a water-soluble alkali metal salt or an alkaline earth metal salt as component (E). Suitable examples of the alkali metal salts include alkaline salts, such as sodium carbonate, sodium hydrogencarbonate, potassium carbonate, and sodium sulfite; and neutral salts, such as sodium chloride, sodium sulfate, sodium nitrate, sodium tripolyphosphate, and sodium pyrophosphate. Suitable examples of the alkaline earth metal salts include beryllium chloride, magnesium chloride, calcium chloride, strontium chloride, and barium nitrate.

These inorganic salts are contributory to improvement in antistatic properties and acceleration of offset ink drying. It should be noted, however, that existence of too much water-soluble inorganic salts is unfavorable because such inorganic salts cause reduction in water-resistant adhesion of ink.

In addition to the essential components (A) to (C) and optional components (D) and (E), the coating layer may contain surface active agents, water-soluble or water-dispersible polymers, finely divided substances, and other auxiliary materials.

Proportions of components (B) to (E) per 100 parts by weight of component (A) are 10 to 600 parts by weight, preferably 50 to 300 parts by weight, for component (B); 25 to 1000 parts by weight, preferably 250 to 600 parts by weight, for component (C); 0 to 500 parts by weight, preferably 10 to 500 parts by weight, particularly preferably 10 to 200 parts by weight, for component (D); and 0 to 200 parts by weight, preferably 5 to 200 parts by weight, particularly preferably 5 to 70 parts by weight, for component (E).

If the proportion of the primer as component (B) is less than 10 parts by weight per 100 parts by weight of the antistatic agent as component (A), the coating layer is inferior in adhesion to ink. Component (B) exceeding 600 parts by weight brings about no further improvement on ink adhesion, only resulting in bad economy.

If the proportion of the polyalkylene ether polymer as component (C) is less than 25 parts by weight per 100 parts by weight of component (A), the antistatic effect in a low humidity environment is insufficient. If it exceeds 1000 parts by weight, the ink adhesion is reduced.

Each of the components is used as dissolved in water or a hydrophilic solvent such as methyl alcohol, ethyl alcohol or isopropyl alcohol, and usually in the form of an aqueous solution. The solution usually has a concentration ranging from about 0.5 to 3% by weight, and preferably from about 1 to 2% by weight.

The coating solution is coated on the thermoplastic resin film by means of a roll coater, a blade coater, an air knife coater, a size press coater, etc., and dried to form a coated film. The coating solution is coated in an amount usually of 0.01 to 8 g/m², preferably 0.05 to 3 g/m², on a solid basis.

The synthetic paper according to the present invention exhibits excellent antistatic properties even in a low humidity environment and has excellent offset printability and gravure printability. The synthetic paper of the invention thus satisfies various requirements in practice.

Having generally described this invention, a further understanding can be obtained by reference to certain specific examples which are provided herein for the purpose of illustration only and are not intended to be limiting unless otherwise specified.

This application is based on Japanese Patent Application No. Hei. 8-159971 filed with the Japanese Patent Office on Jun. 20, 1996, the entire contents of which are hereby incorporated by reference.

Further, unless otherwise noted, all the percentages and parts are expressed in weight.

EXAMPLES

I PREPARATION OF BASE LAYER

Preparation of Synthetic Paper P-1:

(1) Composition C' comprising 88% of polypropylene having a melt flow rate (MFR) of 0.8 g/10 min and a melting point of 164° C. and 12% of calcium carbonate having an average particle size of 1.5 μm was kneaded in an extruder set at 270° C., extruded into a sheet, and cooled in a cooling apparatus to obtain an unstretched sheet.

The sheet was heated to 140° C. and stretched 5 times in the machine direction.

(2) Composition A' comprising 49% of polypropylene having an MFR of 4.0 g/10 min, 5% of maleic acid-modified polypropylene having a maleic acid content of 0.5%, and 46% of calcium carbonate having an average particle size of 1.5 μm (modifying maleic acid monomer contents: 0.05 part per 100 parts of the filler) was melt-kneaded in an extruder set at 270° C. Composition B' comprising 55% of polypropylene having an MFR of 4.0 g/10 min and 45% of calcium carbonate having an average particle size of 1.5 μm was melt-extruded in a separate extruder set at 270° C. Molten compositions A' and B' were laminated in a die and co-extruded on both sides of the 5-fold stretched sheet obtained in (1) above with composition A' as an outer layer to obtain a 5-layered laminated sheet having a structure of A'/B'/C'/B'/A'.

The laminated sheet was heated to 155° C. and stretched 7.5 times in the transverse direction to prepare synthetic paper P-1 having a total thickness of 100 μm (A'/B'/C'/B'/A'=5/20/50/20/5 μm).

Preparation of Synthetic Paper P-2:

(1) Composition C' comprising 79% of polypropylene having an MFR of 0.8 g/10 min, 5% of high-density polyethylene, and 16% of calcium carbonate having an average particle size of 1.5 μm was kneaded in an extruder set at 270° C., extruded into a sheet, and cooled in a cooling apparatus to obtain an unstretched sheet.

The sheet was heated to 140° C. and stretched 5 times in the machine direction.

(2) Polypropylene A' having an MFR of 4.0 g/10 min and composition B' comprising 55% of polypropylene having an MFR of 4.0 g/10 min and 45% of calcium carbonate having an average particle size of 1.5 μm were separately melt-kneaded in the respective extruders set at 270° C., laminated in a die, and co-extruded on both sides of the 5-fold stretched sheet obtained in (1) above with polypropylene A' as an outer layer. The laminated sheet was once cooled to 60° C. and heated to about 160° C. and then up to 165° C., and stretched 7.5 times in the transverse direction by means of a tenter. The stretched sheet was subjected to annealing at 165° C., cooled to 60° C., and trimmed to obtain synthetic paper P-2 having a 5-layered structure and a total thickness of 130 μm (A'/B'/C'/B'/A'=30/3/64/3/30 μm).

II PREPARATION OF COATING AGENT (A) Preparation of Quaternary Ammonium Salt Copolymer (Component A)

Copolymer A-1:

In a 4-necked flask equipped with a reflux condenser, a thermometer, a glass tube for nitrogen displacement, and a stirrer were charged 35 parts of diethylaminoethyl methacrylate, 20 parts of ethyl methacrylate, 20 parts of cyclohexyl methacrylate, 25 parts of stearyl methacrylate, 150 parts of ethyl alcohol, and 1 part of azobisisobutyronitrile, and polymerization was conducted at 80° C. for 6 hours in a nitrogen stream.

To the reaction system was added 70 parts of a 60% aqueous solution of 3-chloro-2-hydroxypropyltrimethylammonium chloride, and the mixture was allowed to react at 80° C. for 15 hours. Ethyl alcohol was removed by evaporation while dropwise adding water, to give copolymer A-1 having a final solids content of 20%.

Copolymer A-2:

Commercially available water-soluble acrylic antistatic agent "SUFTOMER ST 1100B" (produced by Mitsubishi Chemical Co., Ltd.) having the following repeating unit was used:

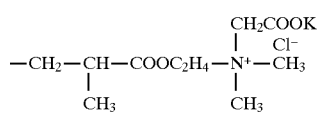

(B) Polyethyleneimine Polymer (Component B):

B-1: "POLYMIN SN", a polyethyleneimine adduct of polyamideamine, produced by BASF, A.G.

B-2: Butyl chloride-modified polyethyleneimine (C) Polyethylene Glycol, Polypropylene Glycol (Component C):

(all produced by Sanyo Chemical Industries, Ltd.)

PEG 400: Polyethylene glycol (molecular weight: 400; Hazen unit: 25 or less; hydroxyl value: 281)

PEG 1000: Polyethylene glycol (molecular weight: 1000; Hazen unit: 25 or less; hydroxyl value: 112)

PEG 4000S: Polyethylene glycol (molecular weight: 3,300; hydroxyl value: 34)

NEWPOL PE-75: Ethylene oxide (50%)-propylene oxide block copolymer (molecular weight: 4,100; Hazen unit: 80 or less; cloud point (1% aqueous solution): 69° C.)

SANNIX PP-2000: Polypropylene glycol (molecular weight: 2,000; Hazen unit: 75 or less)

(D) Polyaminepolyamide-Epichlorohydrin Adduct (Component D):

WS-750: A product of Nippon PMC K.K.

III EVALUATION

Coated synthetic paper prepared in Examples were evaluated in terms of surface resistivity, offset printability, ink transfer and ink adhesion in accordance with the following test methods.

(1) Surface Resistivity

Surface resistivity of synthetic paper was measured with a surface resistivity meter ("HIRESTA MODEL HT-250" manufactured by Mitsubishi Chemical Co., Ltd.) under conditions of 23° C. and 30% or 50% RH (relative humidity).

(2) Offset Printability

Synthetic paper was continuously printed with an offset printing ink ("No. 2 for Synthetic Paper" produced by T & K Toka Co., Ltd.) on an offset printing machine ("DIA 1F-2" manufactured by Mitsubishi Heavy Industries, Ltd.). Ink transfer was rated according to the following standard.

5 . . . No problem

4 . . . Satisfactory regardless of the amount of damping water applied.

3 . . . Slightly poor depending on the amount of damping water applied, but acceptable for practical use.

2 . . . Poor depending on the amount of damping water applied, causing problems on practical use.

1 . . . Poor regardless of the amount of damping water applied.

(3) Ink Transfer

Synthetic paper was printed with ultraviolet-curing ink ("BESTCURE 161" produced by T & K Toka Co., Ltd.) at a color pickup of about 1.5 g/m$^2$ on "RI TESTER" (manufactured by Akira Seisakusho). Whatever defects, such as coating streaks and white spots, due to poor ink transfer were observed with the naked eye and rated as follows.

5 . . . Very good

4 . . . Good

3 . . . Acceptable for practical use although the transferred ink color is thin.

2 . . . The transferred ink color is thin, and streaks are observed.

1 . . . The ink is scarcely transferred.

(4) Ink Adhesion

Synthetic paper was printed in the same manner as in (3) above, except for giving a color pickup of about 2 g/m$^2$. The print was passed under a high-pressure mercury lamp (80 W/cm) placed 10 cm above twice each at a speed of 10 m/min for UV curing. A piece of adhesive tape ("CELLOTAPE" produced by Nichiban Co., Ltd.) was intimately applied onto the ink surface and then quickly peeled off. The results of the peel test were rated as follows.

5 . . . The ink layer does not come off at all.

4 . . . A small portion of the ink layer comes off.

3 . . . The peeled area of the ink layer is not more than 25%.

2 . . . The peeled area of the ink layer is from 25 to 50%.

1 . . . The peeled area of the ink layer is 50% or more.

EXAMPLE 1

Copolymer A-1 (0.5 part), B-2 (0.4 part), and PEG 400 (1.5 part) were mixed, and water was added thereto for the remainder of 100 parts. The mixture was thoroughly stirred to prepare a coating composition.

Both sides of synthetic paper P-1 was subjected to a corona discharge treatment and then coated with the above-prepared coating composition with a roll at a solid spread of 0.05 gm$^2$ per side. The coated film was dried at 65° C. and rolled up.

The physical properties of the resulting coated synthetic paper, i.e., surface resistivity, offset printability, ink transfer, and ink adhesion, were evaluated according to the above-described test methods. The results obtained are shown in Table 1 below.

EXAMPLES 2 TO 7

Synthetic paper P-1 was coated with a coating composition shown in Table 1 in the same manner as in Example 1. The coated synthetic paper was evaluated in the same manner as in Example 1, and the results are shown in Table 1. As shown in Table 1, the coated synthetic paper exhibited excellent antistatic properties and printability.

EXAMPLE 8

Synthetic paper P-2 was coated with a coating composition shown in Table 1 in the same manner as in Example 1. The coated synthetic paper was evaluated in the same manner as in Example 1. The results obtained are shown in Table 1.

COMPARATIVE EXAMPLES 1 TO 6

Synthetic paper P-1 was coated with a coating composition shown in Table 2 below in the same manner as in Example 1. The coated synthetic paper was evaluated in the same manner as in Example 1. The results obtained are shown in Table 2.

COMPARATIVE EXAMPLE 7

Synthetic paper P-2 was coated with the same coating composition as used in Comparative Example 6 in the same manner as in Example 1. The coated synthetic paper was evaluated in the same manner as in Example 1. The results obtained are shown in Table 2.

As can be seen from Table 2, a coating layer containing no quaternary nitrogen-containing polymer of the present invention lacks antistatic properties and is therefore inferior in offset printability.

TABLE 1

| Example No. | Coating Composition (part) | | | | | Test Results | | | | | |
| --- | --- | --- | --- | --- | --- | --- | --- | --- | --- | --- | --- |
| | | | | | | Oily Ink | | UV-Curing Ink | | Surface Resistivity (Ω) | |
| | A | B | C | D* | E | Transfer | Adhesion | Transfer | Adhesion | 30% RH | 50% RH |
| 1 | A-1 (0.5) | B-2 (0.4) | PEG400 (1.5) | — | — | 5 | 5 | 5 | 5 | $1.6 \times 10^{11}$ | $3.2 \times 10^{10}$ |
| 2 | A-1 (0.5) | B-2 (0.4) | PEG1000 (1.5) | 0.5 | — | 5 | 5 | 5 | 5 | $7.0 \times 10^{11}$ | $4.2 \times 10^{10}$ |
| 3 | A-1 (0.5) | B-2 (0.4) | PEG1000 (2.0) | 0.5 | sodium tripoly-phosphate (0.1) | 5 | 5 | 5 | 5 | $3.8 \times 10^{11}$ | $7.5 \times 10^{9}$ |
| 4 | A-1 (0.3) | B-2 (0.6) | PEG1000 (2.0) | 0.5 | Na$_2$CO$_3$ (0.2) | 5 | 5 | 5 | 5 | $8.0 \times 10^{11}$ | $1.5 \times 10^{10}$ |
| 5 | A-1 (0.5) | B-2 (0.4) | NEWPOL (1.5) | 0.5 | Na$_2$CO$_3$ (0.1) | 5 | 5 | 5 | 5 | $7.0 \times 10^{11}$ | $1.3 \times 10^{10}$ |
| 6 | A-1 (0.5) | B-2 (0.4) | SANNIX (1.5) | 0.5 | Na$_2$CO$_3$ (0.1) | 5 | 5 | 5 | 5 | $5.2 \times 10^{11}$ | $9.0 \times 10^{10}$ |

TABLE 1-continued

| Ex-ample No. | Coating Composition (part) | | | | | Test Results | | | | | |
|---|---|---|---|---|---|---|---|---|---|---|---|
| | | | | | | Oily Ink | | UV-Curing Ink | | Surface Resistivity ($\Omega$) | |
| | A | B | C | D* | E | Transfer | Adhesion | Transfer | Adhesion | 30% RH | 50% RH |
| 7 | A-2 (1.0) | B-1 (0.5) | PEG4000 (2.5) | — | $Na_2CO_3$ (0.1) | 5 | 5 | 5 | 4 | $1.5 \times 10^{11}$ | $1.5 \times 10^9$ |
| 8 | A-1 (0.5) | B-2 (0.4) | PEB1000 (2.0) | 0.5 | $Na_2CO_3$ (0.1) | 5 | 5 | 5 | 5 | $3.2 \times 10^{11}$ | $6.8 \times 10^9$ |

Note: *Polyaminepolyamide-epichlorohydrin adduct

TABLE 2

| Comparative Ex-ample No. | Coating Composition (part) | | | | | Test Results | | | | | |
|---|---|---|---|---|---|---|---|---|---|---|---|
| | | | | | | Oily Ink | | UV-Curing Ink | | Surface Resistivity ($\Omega$) | |
| | A | B | C | D* | E | Transfer | Adhesion | Transfer | Adhesion | 30% RH | 50% RH |
| 1 | — | — | PEG1000 (1.5) | — | — | 5 | 3 | 5 | 1 | $1.0 \times 10^{14}$ or more | $1.0 \times 10^{14}$ or more |
| 2 | A-2 (1.0) | — | PEG1000 (1.5) | — | — | 5 | 1 | 5 | 1 | $1.2 \times 10^{11}$ | $1.0 \times 10^9$ or more |
| 3 | — | — | PEG1000 (1.5) | — | $Na_2CO_3$ (0.1) | 5 | 2 | 5 | 1 | $1.0 \times 10^{14}$ or more | $1.0 \times 10^{14}$ or more |
| 4 | A-1 (0.5) | — | PEG1000 (1.5) | — | — | 5 | 1 | 5 | 1 | $2.3 \times 10^{11}$ | $1.6 \times 10^{10}$ |
| 5 | A-1 (0.5) | — | PEG1000 (1.5) | — | $Na_2CO_3$ (0.1) | 5 | 1 | 5 | 1 | $3.8 \times 10^{10}$ | $3.5 \times 10^9$ |
| 6 | A-2 (1.0) | B-2 (0.4) | — | 0.5 | $Na_2CO_3$ (0.1) | 5 | 5 | 5 | 5 | $3.4 \times 10^{13}$ | $3.9 \times 10^9$ |
| 7 | A-2 (1.0) | B-2 (0.4) | — | 0.5 | $Na_2CO_3$ (0.1) | 5 | 5 | 5 | 5 | $2.8 \times 10^{13}$ | $3.1 \times 10^9$ |

Note: *Polyaminepolyamide-epichlorohydrin adduct

While the invention has been described in detail and with reference to specific examples thereof, it will be apparent to one skilled in the art that various changes and modifications can be made therein within the scope of the appended claims, without departing from the spirit and scope thereof.

What is claimed is:

1. A laminate comprising a thermoplastic resin film having, on at least one of its surfaces, a coating layer comprising:
    (A) 100 parts by weight of an antistatic agent comprising a water-soluble quaternary nitrogen-containing polymer;
    (B) 10 to 600 parts by weight of a polyethyleneimine polymer selected from the group consisting of polyethyleneimine, alkyl-modified polyethyleneimine, poly(ethyleneimine-urea), and an ethyleneimine adduct of polyaminepolyamide; and
    (C) 25 to 1000 parts by weight of a polyalkylene ether polymer selected from the group consisting of polyethylene glycol, polypropylene glycol, an ethylene oxide-propylene oxide copolymer, and derivatives thereof, each having a weight average molecular weight of 200 to 20,000.

2. The laminate of claim 1, further comprising component (D) 10 to 500 parts by weight of an epichlorohydrin adduct of polyaminepolyamide.

3. The laminate of claim 1, further comprising component (E) 5 to 200 parts by weight of an alkali metal salt or an alkaline earth metal salt.

4. A laminate of claim 1, further comprising components (D) 10 to 500 parts by weight of an epichlorohydrin adduct of polyaminepolyamide, and (E) 5 to 200 parts by weight of an alkali metal salt or an alkaline earth metal salt.

5. The laminate of claim 4, wherein said component (D) is a water-soluble cationic thermosetting resin obtained by reacting polyamide prepared from a saturated dibasic carboxylic acid containing 3 to 10 carbon atoms and a polyalkylenepolyamine with epichlorohydrin.

6. The laminate of claim 4, wherein said component (E) is selected from the group consisting of sodium carbonate, sodium hydrogencarbonate, potassium carbonate, sodium sulfite, sodium chloride, sodium sulfate, sodium nitrate, sodium tripolyphosphate, sodium pyrophosphate, beryllium chloride, magnesium chloride, calcium chloride, strontium chloride, and barium nitrate.

7. The laminate according to claim 1, wherein said component (A) is a polymer obtained by polymerizing a quaternary nitrogen-containing monomer selected from the group consisting of formulae (Ia) to (IV) and a precursor thereof:

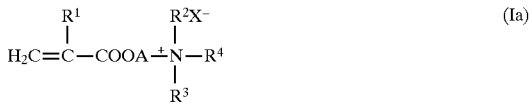

-continued

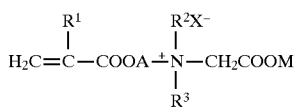

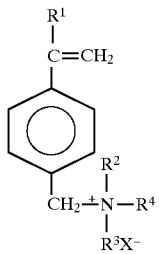

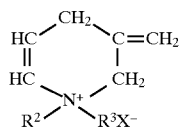

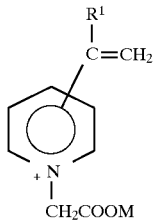

wherein $R^1$ represents a hydrogen atom or a methyl group; $R^2$ and $R^3$ each represent a lower alkyl group; $R^4$ represents a saturated or unsaturated alkyl group having 1 to 22 carbon atoms or a cycloalkyl group; $X^-$ represents a counter anion of the quaternary $N^+$; M represents an alkali metal ion; and A represents an alkylene group having 2 to 6 carbon atoms.

8. The laminate of claim 7, wherein said component (A) is a copolymer comprising (a) 20 to 40% by weight of the quaternary nitrogen-containing monomer represented by formulae (Ia) to (IV), (b) 60 to 80% by weight of a hydrophobic monomer represented by formula (V):

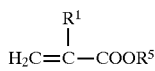

wherein $R^1$ represents a hydrogen atom or a methyl group; and $R^5$ represents an alkyl group having 1 to 22 carbon atoms, an aralkyl group having 7 to 22 carbon atoms or a cycloalkyl group having 5 to 22 carbon atoms, and (c) 0 to 20% by weight of other copolymerizable vinyl monomers.

9. The laminate of claim 8, wherein said monomer (a) is a compound represented by formula (I) wherein $X^-$ is $Cl^-$.

10. The laminate of claim 1, wherein said component (A) is a copolymer comprising (a') 30 to 70% by weight of a monomer represented by formula (VI):

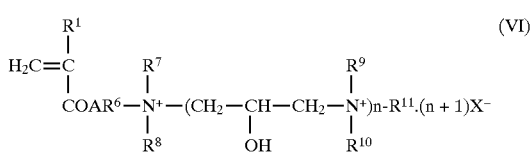

wherein A represents —O— or —NH—; $R^1$ represents a hydrogen atom or a methyl group; $R^6$ represents an alkylene group having 2 to 4 carbon atoms or —CH$_2$—CH(OH)—CH$_2$—; $R^7$, $R^8$, $R^9$, and $R^{10}$, which may be the same or different, each represent an alkyl group having 1 to 3 carbon atoms; $R^{11}$ represents an alkyl group having 1 to 10 carbon atoms or an aralkyl group having 7 to 10 carbon atoms; n represents an integer of 1 to 3; and X represents a chlorine atom, a bromine atom or an iodine atom, (b) 30 to 70% by weight of a hydrophobic monomer represented by formula (V):

wherein $R^1$ represents a hydrogen atom or a methyl group; and $R^5$ represents an alkyl group having 1 to 22 carbon atoms, an aralkyl group having 7 to 22 carbon atoms or a cycloalkyl group having 5 to 22 carbon atoms, and (c) 0 to 40% by weight of other copolymerizable vinyl monomers.

11. The laminate of claim 1, wherein said component (B) is selected from the group consisting of polyethyleneimine and modified polyethyleneimine obtained by modifying a polyaminepolyamide-polyethyleneimine adduct with an alkyl halide having 1 to 24 carbon atoms, an alkenyl halide having 2 to 24 carbon atoms, a cycloalkyl halide having 5 to 24 carbon atoms or a benzyl halide.

12. The laminate of claim 11, wherein said polyethyleneimine in component (B) has a degree of polymerization of 20 to 300.

13. The laminate of claim 1, wherein said component (C) is selected from the group consisting of polyethylene glycol, polypropylene glycol, ethylene oxide-propylene oxide copolymers, an ethylene oxide adduct of lauryl alcohol, an ethylene oxide adduct of stearyl alcohol, and an ethylene oxide adduct of cetyl alcohol.

14. The laminate of claim 13, wherein said component (C) is selected from the group consisting of polyethylene glycol, polypropylene glycol, ethylene oxide-propylene oxide copolymers and derivatives thereof, each having a weight average molecular weight of 200 to 20,000 and containing in the molecule thereof an alkylene ether moiety derived from ethylene oxide or propylene oxide and at least one alcoholic hydroxyl group at the molecular chain end thereof.

15. The laminate of claim 1, wherein said thermoplastic resin film comprises a thermoplastic resin selected from the group consisting of polypropylene, polyethylene, a propylene-ethylene copolymer, polyethylene terephthalate, polybutylene terephthalate, polystyrene and polyamide.

16. The laminate of claim 15, wherein said thermoplastic resin film is a stretched film wherein said at least one surface is subjected to an oxidation treatment selected from the group consisting of a corona discharge treatment, flame treatment, plasma treatment, and ozone treatment prior to coating.

17. A laminate of claim 1, wherein said thermoplastic resin film comprises a stretched polyolefin resin film containing at least one of an inorganic fine powder and an organic filler.

18. The laminate of claim 17, wherein said inorganic fine powder is selected from the group consisting of calcined clay, diatomaceous earth, titanium oxide, vermiculite, calcium carbonate or talc, each having a particle size of 0.05 to 10 μm.

19. The laminate of claim 17, wherein said stretched polyolefin film is a laminate film composed of a biaxially stretched polyolefin film base having provided on both sides thereof a uniaxially stretched polyolefin film.

* * * * *